(12) United States Patent
Choju et al.

(10) Patent No.: US 10,099,956 B2
(45) Date of Patent: Oct. 16, 2018

(54) BOROSILICATE GLASS FOR PHARMACEUTICAL CONTAINER AND GLASS TUBE FOR PHARMACEUTICAL CONTAINER

(71) Applicant: NIPPON ELECTRIC GLASS CO., LTD., Otsu-shi, Shiga (JP)

(72) Inventors: Ken Choju, Otsu (JP); Miki Kimura, Otsu (JP); Kazuyuki Yamamoto, Otsu (JP)

(73) Assignee: NIPPON ELECTRIC GLASS CO., LTD., Otsu-shi, Shiga (JP)

( * ) Notice: Subject to any disclaimer, the term of this patent is extended or adjusted under 35 U.S.C. 154(b) by 0 days.

(21) Appl. No.: 15/508,133

(22) PCT Filed: Aug. 25, 2015

(86) PCT No.: PCT/JP2015/073903
§ 371 (c)(1),
(2) Date: Mar. 2, 2017

(87) PCT Pub. No.: WO2016/035619
PCT Pub. Date: Mar. 10, 2016

(65) Prior Publication Data
US 2017/0283302 A1     Oct. 5, 2017

(30) Foreign Application Priority Data

Sep. 5, 2014 (JP) .................. 2014-180919
Nov. 20, 2014 (JP) .................. 2014-235214

(51) Int. Cl.
| | |
|---|---|
| C03C 3/091 | (2006.01) |
| C03C 3/087 | (2006.01) |
| A61J 1/06 | (2006.01) |
| C03C 4/20 | (2006.01) |
| C03B 23/04 | (2006.01) |

(52) U.S. Cl.
CPC .............. *C03C 3/091* (2013.01); *A61J 1/065* (2013.01); *C03B 23/04* (2013.01); *C03C 3/087* (2013.01); *C03C 4/20* (2013.01); *C03C 2217/28* (2013.01)

(58) Field of Classification Search
CPC ..................................................... C03C 3/091
See application file for complete search history.

(56) References Cited

U.S. PATENT DOCUMENTS

| 4,870,034 A | 9/1989 | Kiefer |
| 5,599,753 A * | 2/1997 | Watzke ............... C03C 3/091 |
| | | 501/66 |
| 2007/0172661 A1 | 7/2007 | Fechner et al. |
| 2014/0323287 A1* | 10/2014 | Tratzky ............... C03C 3/091 |
| | | 501/67 |
| 2015/0246846 A1* | 9/2015 | Choju ................. C03C 3/091 |
| | | 428/34.4 |

FOREIGN PATENT DOCUMENTS

| DE | 10025465 A1 * | 8/2002 | ............ C03C 3/091 |
| JP | S64-18939 A | 1/1989 | |
| JP | 2000-128572 A | 5/2000 | |
| JP | 2014-015365 A | 1/2014 | |
| JP | 2014024731 A * | 2/2014 | ............... A61J 1/05 |
| JP | 2015-098430 A | 5/2015 | |
| WO | WO-2014/014003 A1 | 1/2014 | |
| WO | WO-2014/021142 A1 | 2/2014 | |

OTHER PUBLICATIONS

International Search Report dated Oct. 13, 2015 for PCT/JP2015/073903.
Written Opinion Report dated Oct. 13, 2015 for PCT/JP2015/073903, including partial English translation.

* cited by examiner

*Primary Examiner* — Elizabeth A. Bolden
(74) *Attorney, Agent, or Firm* — Drinker Biddle & Reath LLP

(57) ABSTRACT

A borosilicate glass for a pharmaceutical container having high appearance quality, particularly a small number of air lines, and a glass tube for a pharmaceutical container are provided. The borosilicate glass for a pharmaceutical container contains, in mass %, from 70.0 to 78.0% of $SiO_2$, from 5.0 to 8.0% of $Al_2O_3$, from 5.0 to 12.0% of $B_2O_3$, from 0 to 4.0% of CaO, from 0 to 4.0% of BaO, from 4.0 to 8.0% of $Na_2O$, from 0 to 5.0% of $K_2O$ and from 0.001 to 1.0% of $SnO_2$.

14 Claims, No Drawings

BOROSILICATE GLASS FOR PHARMACEUTICAL CONTAINER AND GLASS TUBE FOR PHARMACEUTICAL CONTAINER

TECHNICAL FIELD

The present invention relates to borosilicate glass for a pharmaceutical container that is used in glass bottles such as vials and ampoules, and syringes of injectors, and a glass tube for a pharmaceutical container.

BACKGROUND ART

The following characteristics are required in borosilicate glass for a pharmaceutical container such as vials and ampoules.
(a) Glass components do not react with components of an aqueous-based medicament present in the container.
(b) Chemical durability and hydrolytic resistance are high so as not to contaminate an aqueous-based medicament present in the containers.
(c) Linear thermal expansion coefficient is low such that breakage due to thermal shock does not occur in a production process of a glass tube and during converting into vials, ampoules and the like.
(d) Working temperature is low such that converting into vials, ampoules and the like is conducted at a low temperature.

Standard borosilicate glass for a pharmaceutical container satisfying those required characteristics contains $SiO_2$, $B_2O_3$, $Al_2O_3$, $Na_2O$, $K_2O$, CaO, BaO and a small amount of a fining agents as constituents (for example, Patent Document 1).

PRIOR ART DOCUMENT

Patent Document

Patent Document 1: JP-A-64-18939

SUMMARY OF THE INVENTION

The Problems that the Invention is to Solve

An aqueous-based medicament is filled in vials and ampoules converted from borosilicate glass tube. The aqueous-based medicament filled in the glass container is checked by an image inspection device upon delivery inspection.

Resolution of an image inspection device is improved year by year. When the resolution of the inspection device is improved, defects such as foreign matters that could not be hitherto confirmed can be detected, and safer medical supplies can be provided. However, defects of a glass itself also become to be detected, and regardless of the absence of foreign matters and the like in a aqueous-based medicament, there is a concern that the aqueous-based medicament is recognized as being poor due to the above situation.

To avoid the situation, it is necessary to reduce glass defects. The greatest glass defect is a stripe-shaped bubble defect narrowly stretched, called "air line". Bubbles generated at the initial stage of melting a glass are decreased in the subsequent fining process, but a certain proportion of those remains and is detected as air line. To decrease the air line, it is necessary to decrease bubbles remained during melting.

An object of the present invention is to provide borosilicate glass for a pharmaceutical container having high appearance quality, particularly a small number of air lines, and a glass tube for a pharmaceutical container.

Means for Solving the Problems

A borosilicate glass for a pharmaceutical container according to the present invention contains, in mass %, from 70.0 to 78.0% of $SiO_2$, from 5.0 to 8.0% of $Al_2O_3$, from 5.0 to 12.0% of $B_2O_3$, from 0 to 4.0% of CaO, from 0 to 4.0% of BaO, from 4.0 to 8.0% of $Na_2O$, from 0 to 5.0% of $K_2O$ and from 0.001 to 1.0% of $SnO_2$.

According to the above composition, $SnO_2$ effectively removes bubbles in a glass in a fining process, thereby decreasing air lines. As a result, borosilicate glass for a pharmaceutical container having good appearance quality can be obtained.

It is preferred in the present invention to further contain $Fe_2O_3$ in an amount of from 0.0001 to 0.04 mass %.

It is preferred in the present invention that $As_2O_3$ and $Sb_2O_3$ are not contained. The wording that "$As_2O_3$ and $Sb_2O_3$ are not contained" means that $As_2O_3$ and $Sb_2O_3$ are not positively added as raw materials, and does not exclude that $As_2O_3$ and $Sb_2O_3$ are unavoidably contained as impurities. Specifically, it means that the amount of $As_2O_3$ is 0.001% or less and the amount of $Sb_2O_3$ is 0.001% or less.

According to the above composition, environmental load when a glass is produced and when a glass is discarded can be greatly reduced.

It is preferred in the present invention to further contain Cl.

According to the above composition, it becomes possible to suppress the generation of stones due to the use of $SnO_2$ and the increase of production cost, while securing sufficient fining effect.

It is preferred in the present invention that an amount of Sn ions eluted in a test solution is 1.0 ppm or less in a glass grains test method of a hydrolytic resistance test according to European Pharmacopoeia 7.0.

According to the above composition, a borosilicate glass for a pharmaceutical container having high chemical durability, in which elution of Sn ions as a fining agenthas been suppressed, can be obtained.

It is preferred in the present invention that a consumption of 0.02 mol/L hydrochloric acid per unit glass mass is 0.030 mL or less in a glass grains test method of a hydrolytic resistance test according to European Pharmacopoeia 7.0.

It is preferred in the present invention that a weight loss per area is 1.0 mg/dm$^2$ or less in an acid resistance test according to DIN 12116. It is preferred in the present invention to have a working temperature of 1200° C. or lower. The working temperature is at which the viscosity of a glass is $10^4$ dPa·s.

According to the above compositions, it becomes possible to lower a converting temperature in preparing a glass container such as an ampoule or a vial from a glass tube, and an evaporation volume of an alkali component in a glass can be remarkably reduced. As a result, the situation that induces change in quality of components of an aqueous-based medicament to be stored in a glass container, increase of pH of the medicament, and the like can be avoided.

It is preferred in the present invention to have a liquidus viscosity of $10^{4.5}$ dPa·s or more.

According to the above composition, even in the case of employing Danner process in forming a glass tube, devitrification during forming is difficult to cause, which is preferred.

A glass tube for a pharmaceutical container according to the present invention includes the above-described borosilicate glass for a pharmaceutical container.

MODE FOR CARRYING OUT THE INVENTION

The reason for limiting a composition range of each component as above is described below. In the following description, unless otherwise indicated, % representation means mass %.

$SiO_2$ is one of elements for constituting a glass network. The content of $SiO_2$ is from 70.0 to 78.0%, preferably from 70.0 to 75.8%, more preferably from 70 to 75.0%, and the most preferably from 70.0 to 74.5%. Where the content of $SiO_2$ is too small, chemical durability is lowered, and acid resistance required in borosilicate glass for a pharmaceutical container cannot be satisfied. On the other hand, where the content of $SiO_2$ is too large, a viscosity of a glass is increased, and bubble removing property is deteriorated.

$Al_2O_3$ is a component of suppressing devitrification of a glass and improving chemical durability and hydrolytic resistance. The content of $Al_2O_3$ is from 5.0 to 8.0%, preferably from 5.0 to 7.5%, and more preferably from 5.5 to 7.5%. Where the content of $Al_2O_3$ is too small, the above effects are not obtained. On the other hand, where the content of $Al_2O_3$ is too large, a viscosity of a glass is increased, and bubble removing property is deteriorated.

$B_2O_3$ has the effect of not only lowering a melting point of a glass, but increasing a liquidus viscosity and suppressing devitrification. For this reason, the $B_2O_3$ is from 5.0 to 12.0%, preferably from 7.0 to 12.0%, more preferably from 8.0 to 12.0%, and still more preferably from 9.0 to 11.0%. Where the content of $B_2O_3$ is too small, a viscosity of a glass is increased, and bubble removing property is deteriorated. On the other hand, where the content of $B_2O_3$ is too large, hydrolytic resistance and chemical durability are lowered.

CaO has the effect of lowering a high temperature viscosity of a glass. The content of CaO is from 0 to 4.0%, preferably from 0 to 2.0%, and more preferably from 0 to 1.5%. Where the content of CaO is too large, hydrolytic resistance is lowered.

BaO has the effect of lowering a high temperature viscosity of a glass. The content of BaO is from 0 to 4.0%, preferably from 0 to 2.0%, and more preferably from 0 to 1.5%. Where the content of BaO is too large, hydrolytic resistance is lowered. When BaO is contained in a glass composition, the phenomenon may occur that barium ions eluted from a glass bring about a chemical reaction with specific components such as sulfate ions contained in a chemical, and precipitate as insoluble matters. For this reason, it is desirable that BaO is not used as possible.

$Na_2O$ has the effect of lowering a viscosity of a glass and increasing a liner thermal expansion coefficient. The content of $Na_2O$ is from 4.0 to 8.0%, preferably from 5.0 to 8.0%, and more preferably from 5.5 to 7.0%. Where the content of $Na_2O$ is too small, a viscosity of a glass is increased, and bubble removing property is deteriorated. On the other hand, where the content of $Na_2O$ is too large, hydrolytic resistance is lowered.

Similar to $Na_2O$, $K_2O$ has the effect of lowering a viscosity of a glass and increasing a linear thermal expansion coefficient. The content of $K_2O$ is from 0 to 5.0%, preferably from 0 to 4.0%, more preferably from 0 to 2.5%, still more preferably from 0.5 to 2.3%, and particularly preferably from 0.5 to 2.0%. Where the content of $K_2O$ is too large, hydrolytic resistance is lowered. When both components, $K_2O$ and $Na_2O$, are used together, hydrolytic resistance is improved by a mixed alkali effect, and this is desirable.

Similar to $Na_2O$ and $K_2O$, $Li_2O$ has the effect of lowering a viscosity of a glass and increasing a linear thermal expansion coefficient. However, when $Li_2O$ is added, a refractory is liable to be corroded during melting a glass, and additionally hydrolytic resistance is lowered. Furthermore, the addition leads to the increase of production costs. For this reason, the content of $Li_2O$ is from 0 to 1.0%, preferably from 0 to 0.5%, and more preferably from 0 to 0.1%. Unless there are special circumstances, it is desirable to use other alkali oxides other than $Li_2O$.

$SnO_2$ is a fining agent of a glass. The content of $SnO_2$ is preferred to be from 0.001 to 1.0%, from 0.01 to 1.0%, from 0.01 to 0.5%, from 0.01 to 0.4%, and particularly from 0.1 to 0.4%. Where the $SnO_2$ content is too large, there is a possibility that stones due to $SnO_2$ are generated, and this leads to the increase of production costs. Therefore, it should be used in a minimum amount exhibiting the effect. Where the content of $SnO_2$ is too small, sufficient fining effect cannot be obtained.

Other than the above components, various components can be added in the present invention.

MgO has the effect of improving chemical durability. The content of MgO is preferred to be from 0 to 4.0%, from 0 to 2.0%, and particularly from 0 to 1.0%. Where the content of MgO is too large, hydrolytic resistance is lowered.

SrO has the effect of improving chemical durability. The content of SrO is preferred to be from 0 to 4.0%, from 0 to 2.0%, and particularly from 0 to 1.0%. Where the content of SrO is too large, hydrolytic resistance is lowered.

$ZrO_2$ has the effect of improving hydrolytic resistance. The content of $ZrO_2$ is preferred to be from 0 to 3.0%, from 0 to 2.0%, and particularly from 0 to 1.0%. Where the content of $ZrO_2$ is too large, a viscosity of a glass is increased, and bubble removing property is deteriorated.

$Fe_2O_3$ may color a glass and decrease a transmittance in a visible region. Therefore, the content is desirable to be from 0.0001 to 0.04%, from 0.0001 to 0.03%, and particularly from 0.001 to 0.02%.

Cl, F, $Na_2SO_4$ and the like may be contained as a fining agent other than $SnO_2$. The total content of those fining agents is preferred to be 1% or less, 0.7% or less, and particularly 0.5% or less. Of those fining agents, Cl is preferably used from the standpoints of a melting temperature and less adverse influence to humans. In the case of using Cl, the content is preferred to be from 0.5% or less, and particularly from 0.01 to 0.1%. Where the content of Cl is too large, Cl evaporates from a glass in converting a glass tube into a container, and attaches to the inner surface of the container, and white turbidity may occur. From the environmental reason, $As_2O_3$ and $Sb_2O_3$ should not be contained.

To maintain a fining effect while suppressing the generation of stones due to $SnO_2$ and the increase of production costs, it is preferred to concurrently use Cl. The content of $SnO_2$ in the case of concurrently using $SnO_2$ and Cl is preferred to be from 0.001 to 0.1%, 0.001 to 0.08%, from 0.001 to 0.06%, from 0.001 to 0.05%, from 0.001 to 0.03%, and particularly from 0.01 to 0.03%. Furthermore, in the case of containing $Fe_2O_3$ in an amount of 0.001% or more, $SnO_2$ is preferred to be from 0.001 to 0.4%, from 0.003 to 0.3%, from 0.005 to 0.2%, from 0.007 to 0.1%, and particularly from 0.01 to 0.05%, in order to achieve high transmittance while maintaining a fining effect.

It is preferred that the borosilicate glass for a pharmaceutical container of the present invention has the following characteristics.

The amount of Sn ions eluted in a test solution is preferred to be 1.0 ppm or less, 0.5 ppm or less, and particularly 0.1 ppm or less, in a glass grains test method of a hydrolytic resistance test according to European Pharmacopoeia 7.0. Where the amount of Sn ions eluted is large, it may change quality of a medicament component.

The consumption of 0.02 mol/L hydrochloric acid per mass of unit glass mass is preferred to be 0.05 mL or less, 0.04 mL or less, and particularly 0.03 mL or less, in a glass grains test method of a hydrolytic resistance test according to European Pharmacopoeia 7.0. Where the consumption of the hydrochloric acid is increased, elution of glass components, particularly alkali components, is greatly increased in preparing bottles such as ampoules and vials, filling an aqueous-based medicament therein and storing, and change in quality of the medicament components may be caused.

The weight loss per unit area is preferred to be 1.0 mg/dm$^2$ or less, and particularly 0.8 mg/dm$^2$ or less, in an acid resistance test according to DIN 12116. Where the weight loss is increased, the amount of glass components eluted is greatly increased in preparing bottles such as ampoules and vials, filling an aqueous-based medicament therein and storing, and change in quality of the medicament components may be caused.

The working temperature is preferred to be 1200° C. or lower, 1195° C. or lower, 1190° C. or lower, 1185° C. or lower, and particularly 1180° C. or lower. Where the working temperature is high, the converting temperature in preparing glass containers such as ampoules and vials from a glass tube is increased, and the evaporation amount of alkali components in a glass is remarkably increased. The alkali components evaporated attach to the inner surface of the glass containers, and elute during storage of an aqueous-based medicament and at autoclave treatment after filling the medicament, and this may change quality of the medicament components, the increase of pH of the medicament, and the like. Furthermore, bubbles are not removed during melting a glass, and quality of bubbles of a product may be lowered.

The liquidus viscosity is preferred to be $10^{4.5}$ dPa·s or more, $10^{5.0}$ dPa·s or more, $10^{5.2}$ dPa·s or more, and particularly $10^{5.6}$ dPa·s or more. Where the liquidus viscosity is too low, devitrification is liable to occur when a sleeve forming in Danner process, and productivity is lowered.

The linear thermal expansion coefficient is an important parameter in thermal shock resistance of a glass. In order to obtain sufficient thermal shock resistance of a glass, the linear thermal expansion coefficient is preferred to be $58 \times 10^{-7}$/° C. or less, and particularly from 48 to $55 \times 10^{-7}$/° C., in a temperature range of from 30 to 380° C.

A method for producing the glass tube for a pharmaceutical container of the present invention is described below. The following description is an example using Danner process.

Glass raw material is prepared so as to have the glass composition described above, and a glass batch is prepared. The glass batch is continuously introduced in a melting furnace of from 1550 to 1700° C., followed by melting and fining. While winding the molten glass obtained around a rotating refractory, the glass is drawn in a tubular shape from the tip of the refractory while blowing air from the tip of the refractory. The tubular glass drawn is cut into a predetermined length, thereby obtaining a glass tube for a pharmaceutical container of the present invention. The glass tube thus obtained is used in the production of vials and ampoules.

The glass tube for a pharmaceutical container of the present invention may be produced using the conventional method, without limiting to Danner process. For example, Vello process and downdraw process are effective methods as the production method of a glass tube for a pharmaceutical container of the present invention.

EXAMPLES

The present invention is described below based on examples.

Tables 1 and 2 show Examples (Sample Nos. 1 to 9 and 11) of the present invention and Comparative Example (Sample No. 10).

TABLE 1

|  | 1 | 2 | 3 | 4 | 5 | 6 |
|---|---|---|---|---|---|---|
| $SiO_2$ | 71.8 | 75.8 | 75.2 | 74.3 | 73.2 | 75.8 |
| $Al_2O_3$ | 7.0 | 6.0 | 5.5 | 6.5 | 6.8 | 6.0 |
| $B_2O_3$ | 11.0 | 10.5 | 10.5 | 10.5 | 10.6 | 10.5 |
| CaO | 0.5 | 0.5 | 1.5 | 1.0 | 0.7 | 0.5 |
| BaO | 1.5 | — | — | — | — | — |
| $Na_2O$ | 6.0 | 6.5 | 7.0 | 6.5 | 6.0 | 6.5 |
| $K_2O$ | 2.0 | 0.5 | — | 1.0 | 2.5 | 0.5 |
| $SnO_2$ | 0.02 | 0.20 | 0.30 | 0.20 | 0.20 | 0.01 |
| $Fe_2O_3$ | 0.015 | 0.012 | 0.018 | 0.016 | 0.015 | 0.016 |
| F | — | — | — | — | — | — |
| Cl | — | — | — | — | — | 0.05 |
| $Sb_2O_3$ | — | — | — | — | — | — |
| $As_2O_3$ | — | — | — | — | — | — |
| Density (g/cm$^3$) | 2.35 | 2.32 | 2.33 | 2.33 | 2.32 | 2.32 |
| α | 52 | 50 | 50 | 53 | 53 | 50 |
| Ps | 525 | 515 | 525 | 515 | 520 | 515 |
| Ta | 570 | 560 | 565 | 555 | 565 | 560 |
| Ts | 785 | 785 | 780 | 775 | 785 | 785 |
| Tw | 1175 | 1180 | 1160 | 1160 | 1170 | 1180 |
| Liquidus viscosity log η (dPa · s) | 5.8 | 5.1 | 4.8 | 5.5 | 5.9 | 5.1 |
| Hydrolytic resistance (mL/g) | 0.025 | 0.025 | 0.030 | 0.030 | 0.030 | 0.025 |
| Acid resistance (mg/dm$^2$) | 0.5 | 0.5 | 0.4 | 0.4 | 0.5 | 0.5 |

TABLE 1-continued

|  | 1 | 2 | 3 | 4 | 5 | 6 |
|---|---|---|---|---|---|---|
| Amount of Sn ions eluted (ppm) | N.D. | N.D. | N.D. | N.D. | N.D. | N.D. |
| Quality of bubbles | Good | Good | Good | Good | Good | Good |

TABLE 2

|  | 7 | 8 | 9 | 10 | 11 |
|---|---|---|---|---|---|
| $SiO_2$ | 75.8 | 74.4 | 74.6 | 74.6 | 74.6 |
| $Al_2O_3$ | 6.0 | 6.8 | 6.5 | 6.5 | 6.5 |
| $B_2O_3$ | 10.5 | 10.2 | 10.4 | 10.4 | 10.4 |
| CaO | 0.5 | 0.3 | 0.3 | 0.3 | 0.3 |
| BaO | — | — | — | — | — |
| $Na_2O$ | 6.5 | 6.1 | 5.9 | 5.9 | 5.9 |
| $K_2O$ | 0.5 | 2.2 | 2.2 | 2.2 | 2.2 |
| $SnO_2$ | 0.02 | 0.03 | 0.03 | — | 0.10 |
| $Fe_2O_3$ | 0.017 | 0.018 | 0.015 | 0.025 | 0.050 |
| F | — | — | — | — | — |
| Cl | 0.03 | 0.02 | 0.04 | 0.04 | 0.04 |
| $Sb_2O_3$ | — | — | — | — | — |
| $As_2O_3$ | — | — | — | — | — |
| Density (g/cm$^3$) | 2.32 | 2.31 | 2.32 | 2.32 | 2.32 |
| α | 50 | 54 | 52 | 52 | 52 |
| Ps | 515 | 525 | 525 | 525 | 525 |
| Ta | 560 | 570 | 570 | 570 | 570 |
| Ts | 785 | 795 | 795 | 795 | 795 |
| Tw | 1180 | 1185 | 1195 | 1195 | 1195 |
| Liquidus viscosity log η (dPa · s) | 5.1 | 5.7 | 5.6 | 5.6 | 5.6 |
| Hydrolytic resistance (mL/g) | 0.025 | 0.025 | 0.024 | 0.024 | 0.024 |
| Acid resistance (mg/dm$^2$) | 0.5 | — | — | — | — |
| Amount of Sn ions eluted (ppm) | N.D. | N.D. | N.D. | N.D. | N.D. |
| Quality of bubbles | Good | Good | Good | Bad | Good |

Each sample was prepared as follows.

A glass batch of 500 g in terms of a glass was prepared so as to have the composition shown in the Tables, and melted at 1650° C. for 4 hours using a platinum crucible. Stirring was performed 2 times during melting in order to remove bubbles in the melt. After melting, an ingot was prepared, processed into a shape necessary for the measurement, and subjected to various evaluations. The results are shown in Tables 1 and 2.

As is apparent from Tables 1 and 2, Sample Nos. 1 to 9 and 11 were good in hydrolytic resistance, chemical durability and quality of bubbles.

Transmittance of each sample was then evaluated. The results are shown in Tables 3 and 4.

TABLE 3

|  | 1 | 2 | 3 | 4 | 5 | 6 |
|---|---|---|---|---|---|---|
| Transmittance | Good | Good | Good | Good | Good | Good |

TABLE 4

|  | 7 | 8 | 9 | 10 | 11 |
|---|---|---|---|---|---|
| Transmittance | Good | Good | Good | Good | Bad |

As a result of evaluation, Sample Nos. 1 to 10 in which the content of $Fe_2O_3$ is 0.04 mass % or less show high transmittance, and were desirable as borosilicate glass for a pharmaceutical container.

The expression N.D. in the amount of Sn ions eluted indicates that the amount was lower than the minimum limit of detection of ICP atomic emission spectrophotometry.

The density was measured with the Archimedes method.

The measurement of the linear thermal expansion coefficient α was conducted in a temperature range of from 30 to 380° C. by a dilatometer using a glass sample molded into a rod shape having a size of about 5 mm diameter×50 mm.

The measurement of the strain point Ps, annealing point Ta and softening point Ts was conducted by a fiber elongation method.

The working temperature Tw was obtained as follows. A viscosity curve of a glass was obtained from a high temperature viscosity obtained by a platinum ball lifting method and a viscosity calculation formula of Fulcher, and a temperature corresponding to $10^4$ dPa·s was obtained from the viscosity curve.

The liquidus viscosity was calculated as follows. A viscosity curve of a glass was obtained from a strain point, an annealing point, a softening point, a working temperature and a viscosity calculation formula of Fulcher, a viscosity of a glass at a liquidus temperature was calculated from the viscosity curve, and the viscosity was used as a liquidus viscosity. The liquidus temperature was measured as follows. A platinum boat having a size of about 120×20×10 mm was filled with a crushed glass sample, and placed in an electric furnace having linear temperature gradient for 24 hours. Thereafter, crystal precipitation site was specified by observation with a microscope, a temperature corresponding to the crystal precipitation site was calculated from a temperature gradient graph of the electric furnace, and this temperature was used as a liquidus temperature.

The hydrolytic resistance test was conducted by crushing a sample using a mortar and pestle made of alumina and performing the method according to European Pharmacopoeia 7.0. The detailed test procedures are as follows. The surface of a sample was well wiped with ethanol, and the sample was crushed with a mortar and pestle made of alumina, and then classified using three sieves made of stainless steel having openings of 710 μm, 425 μm and 300 μm. The sample glass grains remained on the sieves was again subjected to the sieving operations, and the sample glass grains remained on 300 μm sieve was cleaned with ethanol, and introduced in a glass container such as a beaker. Thereafter, ethanol was introduced in the glass container, followed by mixing and cleaning with an ultrasonic cleaning machine for 1 minute. An operation of flowing out only a supernatant was conducted 6 times. Thereafter, the remaining material was dried in an oven of 140° C. for 20 minutes, and cooled in a desiccator for 30 minutes. A sample glass grains obtained was weighed using an electronic balance in 10 g precision of ±0.0001 g, and placed in a 250 mL quartz flask, and 50 mL of pure water was added thereto. The flask was plugged with a watch glass made of quartz, and the flask was then placed in an autoclave, and maintained at 121° C. for 30 minutes. The temperature was increased from 100° C. to 121° C. in a rate of 1° C./min, and decreased from 121° C. for 100° C. in a rate of 2° C./min. The flask was cooled to 95° C., and subsequently quenched with water to a room temperature. Thereafter, the sample was transferred to a conical beaker. An operation of cleaning the inside of the flask with 15 mL pure water and flowing the water into the conical beaker was conducted 3 times. After dropwise adding about 0.05 mL of methyl red to the liquid after the test, neutralization titration was conducted with 0.02 mol/mL hydrochloric acid, the amount of the hydrochloric acid consumed was recorded, and the amount of the hydrochloric acid consumed per 1 g of a sample glass was calculated.

The acid resistance test was conducted according to DIN 12116 under the condition that the surface area of a sample is 50 cm$^2$ and the amount of 6 mol/L hydrochloric acid as test solution is 800 mL. The detailed test procedures are as follows. A glass sample piece having the total surface area of 50 cm$^2$ in which the entire surface was finished by mirror polishing was prepared, and the sample was dipped in a solution obtained by mixing hydrofluoric acid (40 mass %) with hydrochloric acid (2 mol/L) in a volume ratio of 1:9 as a pre-treatment, followed by stirring with a magnetic stirrer for 10 minutes. The sample piece was taken out of the solution, subjected to ultrasonic cleaning in pure water for 2 minutes 3 times, and then subjected to ultrasonic cleaning in ethanol for 1 minute 2 times. The sample piece was dried in an oven of 110° C. for 1 hour, and cooled in a desiccator for 30 minutes. The mass $m_1$ of the sample piece thus obtained was measured up to the precision of ±0.1 mg, and recorded. 800 mL of 6 mol/L hydrochloric acid was placed in a beaker made of quartz glass, and boiled. The sample piece hung with platinum was introduced into the hydrochloric acid and maintained for 6 hours. The opening of a lid of the container was plugged with a gasket and a cooling tube in order to prevent the loss of the amount of the solution during test. The sample piece was taken out of the container, subjected to ultrasonic cleaning in pure water for 2 minutes 3 times, and then subjected to ultrasonic cleaning in ethanol for 1 minute 2 times. The sample piece cleaned was dried in an oven of 110° C. for 1 hour, and cooled in a desiccator for 30 minutes. The mass $m_2$ of the sample piece thus treated was measured to a precision of 0.1 mg, and recorded. Finally, mass decrement per unit area was calculated by the following formula 1 from the masses $m_1$ and $m_2$ of the sample before and after introducing into boiled hydrochloric acid and the total surface area A cm$^2$ of the sample, and was used as a measurement value of the acid resistance test.

$$\text{Mass decrement per unit area} = 100 \times (m_1 - m_2)/(2 \times A) \quad \text{[Formula 1]}$$

The amount of Sn ions eluted was obtained by analyzing the test liquid after the hydrolytic resistance test with ICP atomic emission spectrophotometry (manufactured by Varian). The detailed test procedures are as follows. The test solution after the hydrolytic resistance test was filtered with a membrane filter and collected in a centrifuge tube. Sn standard solution (manufactured by Wako Pure Chemical Industries, Ltd.) was diluted such that Sn content is 0 mg/L, 0.05 mg/L, 0.5 mg/L and 1.0 mg/L to prepare standard solutions. Calibration curves were prepared from those standard solutions, and the amount of Sn eluted in the test liquid was calculated. Measurement wavelength of Sn was 189.925 nm.

The quality of bubbles of a glass was as follows. A sample having 2 cm square and a thickness of 3 mm was cut out from a central part of an ingot prepared, and both surfaces thereof were polished and observed with a microscope. The case that the number of bubbles having 100 μm or more present on 1 cm$^2$ is 1 or less was judged as "Good" and the case that the number is more than 1 was judged as "Bad".

The transmittance of a glass was measured as follows. A sample having a height of 3 cm, a width of 2 cm and a thickness of 1 mm was cut out of a central part of an ingot prepared, and after polishing both surfaces thereof, the transmittance at 300 to 800 nm was measured using a spectrophotometer. When the transmittance at 400 nm is 90% or higher, it was judged as "Good", and when the transmittance at 400 nm is lower than 90%, it was judged as "Bad".

INDUSTRIAL APPLICABILITY

The glass tube for a pharmaceutical container prepared using the borosilicate glass for a pharmaceutical container of the present invention is useful as materials of pharmaceutical containers such as bottles such as vials and ampoules, and syringes of injectors.

The invention claimed is:

1. A borosilicate glass for a pharmaceutical container, comprising, in mass %, from 70.0 to 78.0% of $SiO_2$, from 5.0 to 8.0% of $Al_2O_3$, from 5.0 to 12.0% of $B_2O_3$, from 0 to 4.0% of CaO, from 0 to 4.0% of BaO, from 4.0 to 8.0% of $Na_2O$, from 0 to 5.0% of $K_2O$, from 0.001 to 0.08% of $SnO_2$, and from 0.01 to 0.5% Cl.

2. The borosilicate glass for a pharmaceutical container according to claim 1, further comprising from 0.0001 to 0.04 mass % of $Fe_2O_3$.

3. The borosilicate glass for a pharmaceutical container according to claim 1, which does not contain $As_2O_3$ and $Sb_2O_3$.

4. The borosilicate glass for a pharmaceutical container according to claim 1, wherein an amount of Sn ions eluted in a test solution is 1.0 ppm or less in a glass grains test method of a hydrolytic resistance test according to European Pharmacopoeia 7.0.

5. The borosilicate glass for a pharmaceutical container according to claim 1, wherein an amount of 0.02 mol/L hydrochloric acid consumed per unit glass mass is 0.030 mL or less in a glass grains test method of a hydrolytic resistance test according to European Pharmacopoeia 7.0.

6. The borosilicate glass for a pharmaceutical container according to claim 1, wherein a mass decrement per area is 1.0 mg/dm$^2$ or less in an acid resistance test according to DIN 12116.

7. The borosilicate glass for a pharmaceutical container according to claim 1, having a working temperature of 1200° C. or lower.

8. The borosilicate glass for a pharmaceutical container according to claim 1, having a liquidus viscosity of $10^{4.5}$ dPa·s or more.

9. A glass tube for a pharmaceutical container, comprising a borosilicate glass for a pharmaceutical container according to claim 1.

10. The borosilicate glass for a pharmaceutical container according to claim 1, wherein the content of $SnO_2$ is from 0.001 to 0.05 mass %.

11. The borosilicate glass for a pharmaceutical container according to claim 1, wherein the content of Cl is from 0.01 to 0.1 mass %.

12. A borosilicate glass for a pharmaceutical container, comprising, in mass %, from 70.0 to 78.0% of $SiO_2$, from 5.0 to 8.0% of $Al_2O_3$, from 5.0 to 12.0% of $B_2O_3$, from 0 to 4.0% of CaO, from 0 to 4.0% of BaO, from 4.0 to 8.0% of $Na_2O$, from 0 to 5.0% of $K_2O$, from 0.001 to 0.08% of $SnO_2$, and from 0.0001 to 0.04% of $Fe_2O_3$.

13. The borosilicate glass for a pharmaceutical container according to claim 12, wherein the content of $SnO_2$ is from 0.001 to 0.05 mass %.

14. The borosilicate glass for a pharmaceutical container according to claim 12, wherein the content of Cl is from 0.01 to 0.1 mass %.

* * * * *